April 16, 1957  W. L. SHEPPARD  2,788,678
TRANSMISSION CONTROL SYSTEM
Filed April 13, 1953  3 Sheets-Sheet 1
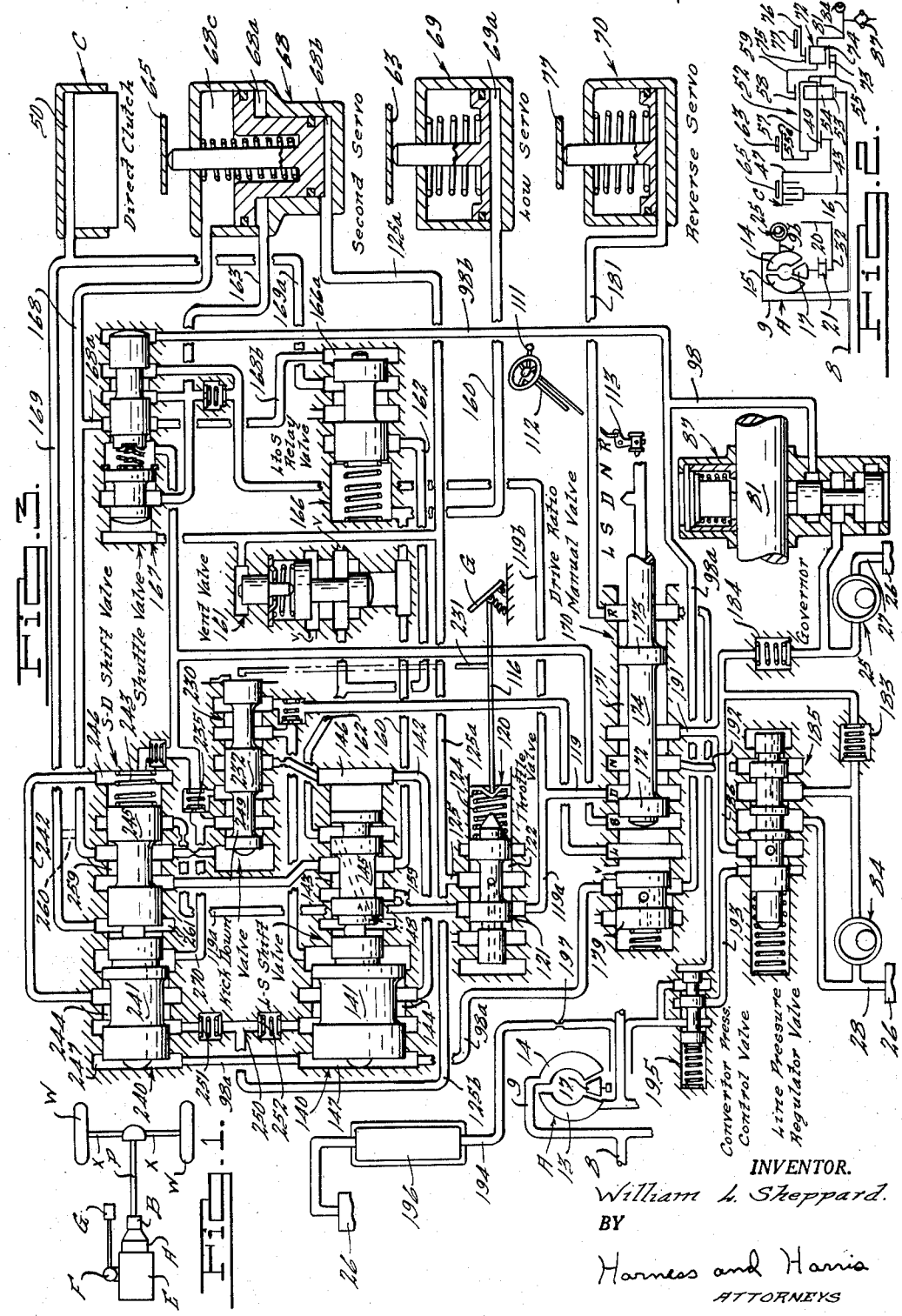
INVENTOR.
William L. Sheppard.
BY
Harness and Harris
ATTORNEYS

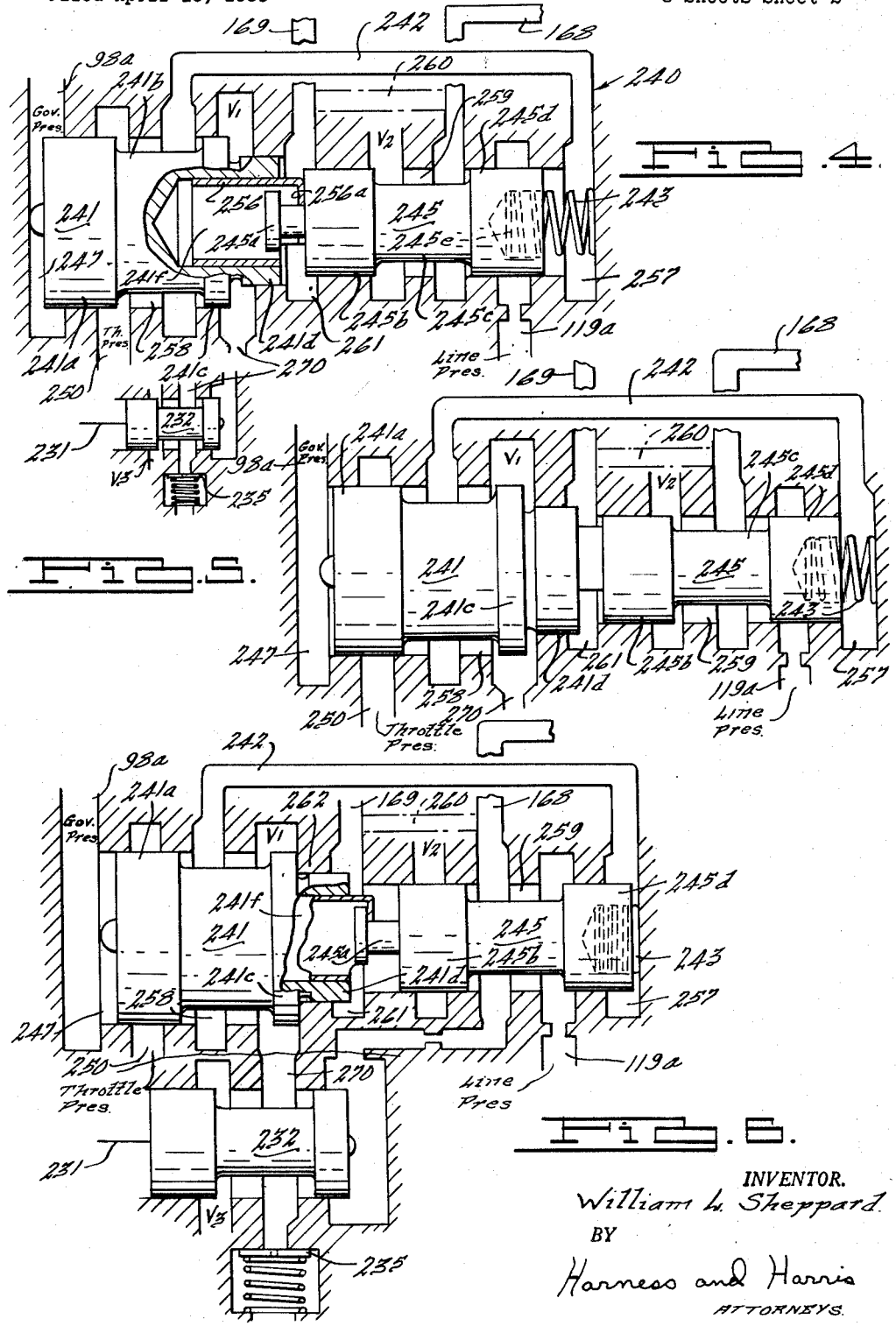

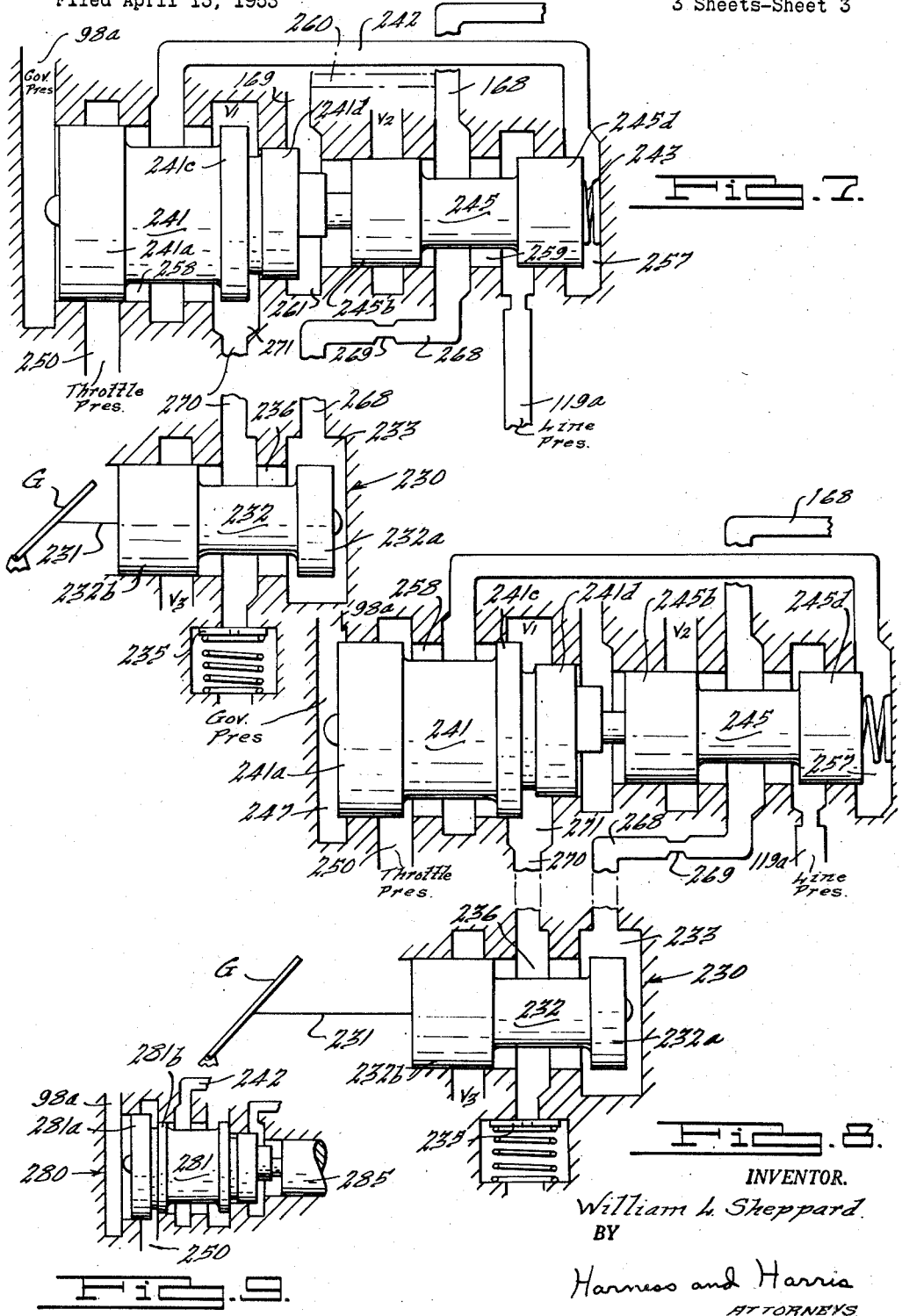

United States Patent Office 2,788,678
Patented Apr. 16, 1957

2,788,678

TRANSMISSION CONTROL SYSTEM

William L. Sheppard, Romulus, Mich., assignor to Chrysler Corporation, Highland Park, Mich., a corporation of Delaware Application April 13, 1953, Serial No. 348,485

26 Claims. (Cl. 74—645)

This invention relates to hydraulic control systems for motor vehicle power transmission units and the like, and particularly to an improved type of shift control valve unit for such systems.

It is a primary object of this invention to provide a two-piece, differential pressure operated, shift control valve unit of simplified design that is designed such that fast, positive, valve shifting may be readily accomplished upon variation in the relationship between the opposed pressure fluids applied to the valve elements of the valve unit.

It is a further object of this invention to provide a simplified form of two-piece, differential pressure operated, shift control valve wherein at least one of the pressure fluids applied to the valve elements is arranged in such a manner as to accomplish snap action shifts of the valving in each of its directions of control movement.

It is still another object of this invention to provide a two-piece, differential pressure operated, shift control valve unit with an associated operator controlled kickdown valve arranged in such a manner that a first relatively low pressure fluid can be applied to the valve elements of the valve unit to initiate a kickdown or driver controlled downshift, and thereafter, when the valve elements approach a predetermined point of movement towards their downshifted position, a second relatively high pressure fluid is applied to the valve elements to accomplish a snap action downshift or kickdown of the valve elements to their desired positions.

Other objects and advantages of this invention will become readily apparent from a reading of the following description and a consideration of the related drawings wherein:

Fig. 1 is a diagrammatic plan view of a motor vehicle having a power transmission unit embodying this invention;

Fig. 2 is a schematic diagram of the power transmission unit utilized in Fig. 1;

Fig. 3 is a diagrammatic view of a hydraulically operated control system for the power transmission unit shown in Fig. 2, which control system employs shift valves embodying this invention;

Fig. 4 is an enlarged sectional elevational view of one of the differential pressure operated, speed ratio shift valve units of the disclosed transmission control system which valve unit embodies this invention; the valves thereof being shown in their downshifted positions;

Fig. 5 is an enlarged sectional elevational view similar to Fig. 4 but showing the valves of the valve unit upshifting and at the snap over position;

Fig. 6 is an enlarged sectional elevational view similar to Fig. 4 but showing the valves of the valve unit snapped over to their upshifted positions;

Fig. 7 is an enlarged sectional elevational view similar to Fig. 4 showing the valves of the valve unit at the beginning of a kickdown from their upshifted positions;

Fig. 8 is an enlarged sectional elevational view similar to Fig. 4 showing the valves of the valve unit at the snap over position during a kickdown from their upshifted positions; and Fig. 9 is an enlarged fragmentary sectional elevational view similar to Fig. 4 but showing a modified form of valve with a throttle responsive downshift.

Fig. 1 diagrammatically discloses a conventional motor vehicle power plant and drive train comprising an internal combustion engine E drivingly connected through a hydrokinetic type of torque converter unit A to a change speed gear box B. The output from gear box B drives a propeller or drive shaft P that transmits drive to the rear wheels W of the vehicle through the rear driving axles X. Engine E includes the usual carburetor F with a carburetor accelerator pedal G.

Fig. 2 of the drawings diagrammatically discloses the power transmission unit which comprises the hydrokinetic torque converter unit A and the planetary type change speed gear box B arranged in series drive transmitting relationship. This transmission unit is specifically claimed in the copending application of Bert W. Cartwright, Serial No. 308,123, filed September 5, 1952. Converter unit A is adapted to drivingly connect a prime mover such as the motor vehicle engine E to the input shaft of transmission gear box B. The reference numeral 8 in Fig. 2 represents the rear end portion of the engine crankshaft of the motor vehicle power unit E. The crankshaft 8 is drivingly connected to the casing portion 9 of the converter A. Within converter casing portion 9 are mounted the various converter components, namely, the impeller member 14, the turbine or runner member 15, and the guide wheel or reaction member 17.

The vaned impeller wheel 14 is fixedly connected to the converter casing 9 and is accordingly adapted to be rotatably driven by the engine driven crankshaft 8. The vaned turbine wheel 15 is drivingly connected to the converter driven shaft 16. The converter driven shaft member 16 is adapted to transmit drive from the torque converter unit A to the gear box B arranged rearwardly of and in series with the torque converter unit A.

The vaned guide wheel 17 of the converter is rotatably supported within the converter casing 9 by means of a one-way brake device 21. The one-way brake device 21 is mounted on the forward end of an axially extending sleeve 32 that is fixed to and projects from the rearwardly positioned, relatively stationary, gear box casing wall 20. The one-way brake 21 is designed and arranged such that it will permit only forward rotary movement (clockwise when looking from the converter A towards gear box B of Fig. 2) to be transmitted to guide wheel 17 by the forward or clockwise rotation of the impeller 14. The brake 21 locks against the sleeve 32 to prevent rotation of the guide wheel 17 in a reverse or counterclockwise direction.

The torque converter unit A (see Fig. 2) includes a gear type oil pump 25 having a driven gear that is directly connected to the axially extending, sleeve-like flange portion 9b of the rotatable converter casing 9. The pump 25 draws oil from a sump 26 (see Fig. 3) through the conduit 27 and circulates it through the converter unit A, portions of the transmission lubricating system, and the various hydraulically operated control mechanisms associated with this transmission unit. The circulation of oil through the converter A, by the pump 25, provides a means for maintaining the converter A full of oil whenever the engine crankshaft 8 is rotating. A second oil pump 84 driven by the transmission output shaft 81 is also included in this power transmission unit to provide a source of pressure fluid when the engine E is not operating. Pump 84 is connected to oil supply sump 26 (see Fig. 3) by conduit 28 and discharges oil to the same elements as does the engine driven pump 25.

The gear box B is specifically described in the said copending application of Bert W. Cartwright, Serial No.

308,123, filed September 5, 1952 and includes a friction disc direct drive clutch C. Annular member 43 of clutch C is drivingly connected to the intermediate driven shaft 16. Driven shaft 16 thus constitutes the input member of clutch C. Mounted on the peripheral portion of the annular member 43 are friction disc clutch elements that are adapted to be engaged with cooperating clutch elements carried by the encircling drum-shaped member 47 of clutch C. Drum-shaped member 47 is drivingly connected to the sun gear 49 of the change speed gear box B and thus constitutes the driven member of clutch C. Engagement of clutch C is effected by the admission of pressure fluid to a cylinder bore (not shown) containing the aforementioned clutch elements.

The planetary gearing that is disposed between the clutch C and the output shaft 81 comprises a first set of compounded gearing 52 to provide for the several forward drive ratios and a second set of gearing 72 to provide for reverse drive. Forward drive gearing 52 includes the sun gear 53 which is an integral part of the intermediate drive shaft 16. Sun gear 53 meshingly engages with the short pinion gear members 54 of the compounded or double pinion gears 54, 57 that are rotatably mounted on the carrier element 55. Carrier 55 is provided with a sun gear portion 73 that forms part of the reverse drive planetary gear set 72. Carrier element 55 journals the short pinion gears 54 and it also journals the long pinion gears 57. The relatively long pinion gears 57 are meshingly engaged with the relatively short pinion gears 54 and with the clutch drum mounted sun gear element 49. The long pinion gears 57 also have portions thereof surrounded by and meshingly engaged with the annulus gear 58.

Annulus gear 58 is part of a drive transmitting member 59 that is drivingly connected to the output shaft 81. Drive transmitting member 59 includes in addition to the annulus gear portion 58 pinion gear axles that journal the pinion gears 74 of the reverse gear set. Pinion gears 74 will be further described in the following description of reverse drive gear set 72.

The carrier member 55 of gear set 52 has an axially extending brake drum portion 55a that is adapted to be engaged by a brake band 63. Brake band 63 is adapted to be applied to the brake drum portion 55a of carrier 55 to anchor carrier 55 against rotation and thereby activate forward drive gear set 52 for the transmission of the Low speed forward drive ratio.

It will also be noted that the outer periphery of the drum member 47 of direct drive clutch C is encircled by a brake band 65. Application of brake band 65 to drum 47 anchors the drum 47 and the attached sun gear 49 against rotation and conditions the forward drive gear set 52 for the transmission of the Second or Kicked Down speed ratio drive.

From a consideration of Fig. 2, it is thought to be clear that input to gear train 52 is from the input or sun gear 53 to the small pinion gears 54. Small pinion gears 54 are meshed with and drive the long pinion 57. Long pinions 57 are meshed with and drive annulus gear 58 whenever the reaction brake bands 63 or 65 are applied to elements 55 or 47 respectively of the gear train 52 so as to give either Low or Second speed forward drive respectively. When clutch C is engaged, then input gear 53 and reaction gear 49 of gear train 52 are both drivingly connected to the drive shaft 16 so the gear train 52 is then locked up for the transmission of direct drive.

Arranged rearwardly of the forward drive planetary gearing 52 is a second set of planetary gearing that is designated generally by the numeral 72. The gear set 72 provides for reverse drive and comprises the sun gear element 73 that is an integral part of the carrier member 55 of forward drive gear set 52. Sun gear 73 meshingly engages with pinion gears 74 that are rotatably mounted on the pinion gear carrier 59. As previously mentioned carrier 59 is drivingly connected to the output shaft 81 and also forms an integral part of the annulus gear 58 of gear set 52 so it will thus be seen that the carrier member 59 provides the output or drive transmitting member for each of the sets of planetary gearing 52, 72. An annulus gear 75 is formed as part of a drum member 76. Annulus gear 75 is arranged in meshing engagement with pinion gears 74 of the gear set 72. The outer peripheral flange of the drum member 76 is encircled by a brake band 77 that is adapted to be applied to the drum member 76 to anchor same against rotation and condition gear set 72 for the transmission of a Reverse drive between shafts 16 and 81.

Mounted adjacent to and driven by output shaft 81 is the second oil pump 84. Oil pump 84 is similar to oil pump 25 and includes a driving gear element (not shown) that is drivingly connected to the transmission output shaft 81. Oil is withdrawn by pump 84 from the transmission case oil sump 26 through the conduit 28 (see Fig. 3). Pressurized oil is distributed (see Fig. 3) by the pump 84 to the supply for the converter A and to the hydraulic control system for the transmission as well as to the pressurized transmission lubrication system.

A hydraulic control system for the hereinbefore described transmission unit, or a similar type of transmission unit, is shown diagrammatically in Fig. 3. The control system includes a vehicle speed responsive governor mechanism 87 that would probably be mounted on the output shaft 81 of the herein described transmission. This governor 87 is identical to that described and claimed in William L. Sheppard co-pending application Serial No. 98,493, filed June 11, 1949. In addition to the vehicle speed responsive control unit 87, some form of torque regulating or torque responsive control such as a valve operated by the engine accelerator pedal G is included in this transmission control system so as to provide both speed and torque responsive control mechanisms to control operation of the transmission.

It is proposed to have suitable hydraulic controls for this transmission so as to provide a fully automatic three forward speeds gear box in addition to providing means for selectively locking the transmission in either of the two forward underdrive ratios and reverse drive.

The control system (see Fig. 3) for this transmission includes the manually operable drive ratio selector lever 111 which is rotatably mounted on the conventional motor vehicle steering column 112. Control lever 111 is connected by suitable linkage 113 to the manually operable drive ratio selector valve 170. Drive ratio selector valve 170 has five drive ratio positions which are represented in the drawings by the letters R, N, D, S and L respectively. These letters correspond to the Reverse, Neutral, Drive, Second and Low ratios which ratios are selectively obtainable by manual shift of selector lever 111. The letter V associated with the valve units 120, 170 and with the other valve units of this control system, denotes a vent or drain port for returning the control system pressure fluid to the fluid supply sump 26.

Pressure fluid from either of the supply pumps 25 or 84 is directed into the main supply conduit 191 which is connected to the manually operable drive ratio selector valve 170. The pressure of the fluid in supply conduit 191 is controlled by the pressure regulator valve 185 and this controlled pressure fluid supplied to valve 170 is denoted "line" pressure (normally about 90 p. s. i.) for purposes of description hereafter. Check valves 183 and 184 maintained a closed pressure fluid supply system. On admission of "line" pressure fluid to the bore 171 to drive ratio selector valve 170 certain of the control mechanisms associated with the control system will be energized and one or the other of the several aforementioned drive ratios will be established. When the manual valve 170 is located in the Neutral position the valve lands 172 and 173 of plunger or spool type valve element 174 close off the escape of pressurized line fluid from valve bore 171 except through conduit 192 that leads to the pressure regulator valve 185. Thus "line" pressure fluid cannot pass from supply conduit 191 through valve 170 to activate any of the drive ratio control mechanisms. However, it should be noted that when the manually controlled valve 170 is placed in the Neutral position with the vehicle engine running, or when the vehicle is being pushed or towed so that one or the other of pumps 25 or 84 is operating, "line" pressure fluid from one or the other of pumps 25, 84 can still be directed through conduits 192 and 186 to the "line" pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is passed on to the pressurized transmission lubrication system and to the sump 26 by the conduit 194. Conduit 194 may have associated therewith a flow restriction 197 and in some cases a converter fluid cooling unit 196. The converter pressure regulator valve 195 may be set to maintain a pressure of approximately 55 to 60 p. s. i. in the converter at all times.

In either of the forward drive ratio positions D or S or L of the drive ratio selector valve element 174, "line" pressure fluid from supply conduit 191 will always be directed through the bore 171 of valve unit 170 and into the connected conduits 119, 119a that connect the manual drive ratio selector valve unit 170 with the torque control or torque regulating throttle valve unit 120. Consequently a form of torque responsive control is always available to cooperate with the driven shaft speed responsive governor 87 to conjointly control automatic operation of this transmission unit in all forward drive ratios. "Line" pressure passed to conduit 119, whenever the ratio selector valve 170 is set for a start in either Drive, Second or Low ratio, also fills conduit 119a and is passed to and around throttle valve 120 and then to the Low to Second shift valve 140. It will be noted that the conduit 119a has a branch conduit 159 connected thereto to divert pressurized "line" pressure fluid to the bore portion 143 of the shift valve unit 140. "Line" pressure admitted to valve bore portion 143 is transferred by conduit 160 to the apply side 69a of the Low servo 69. Application of "line" pressure to the apply side of servo 69 applies band 63 and activates the transmission for the Low or first speed forward underdrive. Thus the planetary gear train 52 is initially activated for the Low forward underdrive whenever valve unit 170 is set for a starting drive in either Drive or Second or Low, that is, all starts forwardly will be through the Low underdrive initially.

The torque responsive throttle valve unit 120 has operably associated therewith through linkage 231 a kickdown valve-controlled mechanism 230 that is hereinafter described. The torque responsive throttle valve 120 is operated by linkage 116 connected to the throttle control or accelerator pedal G for the engine unit E that drives this power transmission unit. The piston type throttle valve element 121 of valve unit 120 is arranged to be reciprocated by oscillation of the linkage 116. Throttle valve unit plunger element 121 is arranged to reciprocate in the bore 122 of the valve unit 120 and it is connected to the actuating linkage 116 through a compression spring 124. At closed or idle throttle position of the accelerator pedal G with the manual control valve 170 set for either of the forward drive ratios D, S or L, the arrangement of the plunger valve 121 in the bore 122 of valve 120 is such as to permit some pressurized fluid to flow from the supply conduit 119a through valve bore 122 of valve 120 and into the conduit 125 and its branch conduits 125a and 125b. The pressure of the fluid passing out of valve 120 into conduit 125 may be lower than that of the "line" pressure supplied to valve 120 by conduit 119a due to the reducing valve action of valve 121. This reduced or compensated "line" pressure supplied to conduits 125, 125a and 125b, is denoted "throttle" pressure hereafter.

Admission of "throttle" pressure to the branch conduit 125b permits this throttle responsive pressurized fluid to be passed to the conduit 250 that includes the check valves 251 and 252 respectively. Conduit 250 is connected to the bores of valves 140 and 240. "Throttle" pressure fluid passed through conduit 250 to the bores 144 and 244 of shift valves 140 and 240 respectively can be passed through the conduits 142, 242 respectively and be applied to the right ends of the plunger or spool type valves 145 and 245 of control valves 140 and 240 respectively whenever the vehicle is at a stop or traveling at relatively low speeds. Under such conditions the valves 141, 145 and 241, 245 will be positioned towards the left ends of their respective valve bores and conduit 125b is then connected to conduits 142 and 242 and the chambers 146, 246 at the right ends of valves 140, 240. Drive ratio shift control valves 140 and 240 are differential pressure operated shift valves that automatically effect the speed ratio shifts between Low and Second and Second and Direct respectively. The details and the manner of operation of these differential pressure operated control valves are subsequently described.

"Governor" pressure fluid from the governor output conduit 98 is passed into branch conduit 98a which applies the output shaft speed responsive pressurized fluid to the chambers 147, 247 at the left end of valves 140 and 240. This "governor" pressure in the valve bores at the left end of valve units 140, 240 tends to urge the plunger or spool-type two-piece valve elements 141, 145 and 241, 245, towards the right ends of the valve units 140, 240. Thus it will be seen that the pressure differential between the "throttle" pressure fluid and the output shaft speed responsive pressurized fluid, which fluids are applied to opposite ends of valves 141, 145 and 241, 245, effects reciprocating movement of these two-piece connected shift valves within their valve bores. At relatively low output shaft speeds with the throttle valve 121 cracked open, the "throttle" pressure in conduit 125b is greater than the "governor" pressure in conduit 98a and the valves 141, 145 and 241, 245 are automatically positioned towards the left ends of their valve bores. As the output shaft speed increases a point is reached where the "governor" pressure from conduit 98a exerts a force on the left end of the valves 141, 241 that overcomes the force of the "throttle" pressure on right ends of the valves 145, 245 and then the two-piece shift valves 141, 145 and 241, 245 successively shift towards the right to upshifted positions such as that shown in Fig. 6 which correspond to upshifted Direct drive position of the valves 241, 245. This differential pressure generated shift of the two-piece shift valves 141, 145 and 241, 245 is utilized to automatically control operation of the direct drive clutch C and the servos 68 and 69 for the forward drive braking bands 63, 65. It should be pointed out that the diameters of valves 141, 145 are greater than the diameters of valves 241, 245 and thus the same pressurized fluids admitted to the valve units 140, 240 will produce different shift forces and as a result different points are obtainable for the shifts from Low to Second and Second to Direct. Also connected valves 241, 245 must work against a spring 243 so this raises the Second to Direct upshift point above that of the Low to Second upshift. Upshift of valves 141, 145 may occur from about 9 to 18 M. P. H. while upshift of valves 241, 245 may occur from about 18–68 M. P. H. It is thought to be obvious that the points of shift of the shift control valves will vary considerably depending on the degree of throttle valve opening as compared to the output shaft speed at any given time.

After initiating drive in "Low" the rightward upshift of shift valves 141, 145 will connect the bore portion 143 of the valve 140 to vent conduit 162 and this will vent the band applying "line" pressure from "Low" servo 69 through the vent valve 161 due to the bore 143 in valve 140 connecting the Low servo supply conduit 160 to the vent conduit 162. At the same time, upshift of connected valves 141, 145 to the right will vent "line" pressure from the band "off" or "release" chamber 68c of the "Second" speed control servo 68. This venting of chamber 68c is due to conduit 168 being connected through the bore portion 259 of valve 240 to the conduit 249 which is also connected to the bore portion 143 of valve 140 and the vent valve 161. "Line" pressure that was directed into band applying chamber 68a of servo 68 during the application of the Low band 63 by servo 69 was not previously effective to simultaneously apply Second band 65 due to the existence of "line" pressure in the band "off" or "release" chamber 68c of servo 68. However, on venting of the "off" chamber 68c of Second servo 68 simultaneously with the venting of the apply chamber 69a of Low servo 69, then Second band 65 is applied as Low band 63 is released. Thus as "Low" control band 63 is released "Second" control band 65 is applied to effect the upshift to "Second" speed. In addition to using "line" pressure to apply "Second" band 65, "throttle" pressure is also applied to chamber 68b of servo 68 by way of conduit 125a to assist the "line" pressure in chamber 68a in holding band 65 applied. Relay valve 166 and shuttle valve 167 also participate in controlling the pressure fluids applied to the several servos but it is not thought that a description of their functions is necessary for an understanding of the invention claimed herein.

After the upshift from "Low" to "Second" then subsequently the Second to Direct shift valve 240 will effect an automatic upshift from "Second" to "Direct." To accomplish this shift "line" pressure is directed into release chamber 68c of servo 68 by way of conduit 168 so as to effect release of "Second" band 65. At the same time "line" pressure is directed by way of conduit 168a, valve 167, conduit 168b, valve bore 166a and through conduit 169a to the clutch apply chamber 50 of clutch C. Conduit 169a also feeds "line" pressure to conduit 169 for supply to chamber 261 of valve 240 to effect elongation of the connected valves 241, 245. Engagement of clutch C effects lock up of planetary 52 so as to provide for the transmission of a forward direct drive from shaft 16 to output shaft 81. Automatic downshifts from Direct to Second to Low are effected in the reverse manner to that described for the upshifts.

In addition to the automatic downshifts from Direct to Second to Low, it is possible for the transmission or vehicle operator to overrule the automatic controls and effect a downshift from "Direct" to "Second" at substantially any time he desires by merely fully depressing the accelerator pedal G. Such an accelerator depression will cause linkage 116 (see Figs. 3, 7 and 8) to apply linkage 231 to the right end of kickdown valve 230 and shift valve element 232 to the left. Leftward shift of valve 232 when the transmission is operating in "Direct" will bring about an immediate downshift from "Direct" to "Second" due to the application of a pressurized fluid to the right end of the Second to Direct shift valves 241, 245. When valves 241, 245 are kicked down then "line" pressure is supplied to chamber 68a of servo 68 and venting of the bore 50 of clutch C occurs. After the kickdown to "Second" the transmission control system will either automatically upshift to "Direct" on release of the depressed accelerator G, or, if the output shaft speed should be dropping, then possibly the control system would automatically downshift to "Low" for a more favorable speed ratio drive in the starting underdrive ratio.

In addition to the operator effected, accelerator pedal actuated downshift, the transmission operator can also downshift from "Direct" to "Second" or "Low" by manually shifting drive control lever 111 to either the "Second" or "Low" position. This manual shift will lock the transmission in the particularly selected drive ratio and prevent automatic upshifts or downshifts therefrom. Locking of the transmission in either the "Second" or "Low" ratio is particularly advantageous for coast braking. It might be pointed out that the control system includes valve means 179 in the manual control valve unit 170 to limit the top speed at which the manual downshift to "Low" may be accomplished. If the manual shift to "Low" is attempted at too high a speed then the transmission will first downshift to "Second" and thereafter, when the speed has dropped sufficiently, will then downshift to "Low" and remain locked in the preselected "Low" ratio until the control lever 111 is shifted to some other ratio.

Reverse drive is accomplished by setting the drive control lever 111 in the Reverse position. This causes the control system to pass a boosted "line" pressure through conduit 181 to the Reverse servo 70 and apply band 77 to annulus gear 75 so as to condition reverse drive planetary gear set 72 for transmission of a reverse drive to output shaft 81. The other portions of the control system are deactivated at this time so there is no automatic upshifting or downshifting involved. However, in addition to the torque effect of the gear set 72 there is also the torque multiplication of the converter A so a starting reverse drive ratio of 19.8 to 1 is possible.

As the invention herein described and claimed does not relate to controls generally but the shift valves per se, it is not thought that a more detailed description of the control system is required. Suffice it to say that with the torque converter A having a torque multiplying stall ratio of 2.5 and with a rear wheel driving axle ratio of 3.1, then the table set forth below gives the pertinent information relative to the driving ratios obtainable with a transmission of this type.

| 2.5 Torque Converter | | 3.1 Axle Ratio | |
| --- | --- | --- | --- |
| Drive Ratio | Control Applied | Gear Ratio | Overall Ratio |
| Low (1st) | Band 63 | 2.69 | 20.9–8.35 |
| Kickdown (2nd) | Band 65 | 1.53 | 4.74 |
| Direct (3rd) | Clutch C | 1.00 | 3.10 |
| Reverse | Band 77 | 2.55 | 19.8–7.91 |

From a consideration of the aforegoing description and the related drawings, it is thought to be clear that this transmission provides a compact, rigid, relatively simple gear box that can be combined with a hydrodynamic torque converter device to provide a fully automatic three speed gear box that will give the required ratios and flexibility in order to efficiently operate a present day motor vehicle in current traffic and on current highways. When forward drive is to be initiated, the controls are set in Drive and this will initially apply the Low Band 63 to drum 62 and thereby activate gear set 52 for the "Low" ratio. By initially starting in "Low" or 1st speed, the gearing 52 is combined with the torque multiplication of converter A so as to give a starting drive overall ratio of as much as 20.9 to 1. The control system will thereafter, when speed and torque conditions are satisfactory, automatically release band 63 and apply band 65 to sun gear drum member 47 so as to upshift the drive ratio from the "Low" or 1st speed to the 2nd or "Kickdown" speed ratio drive. Thereafter, when speed and torque conditions are satisfactory, the control system will again automatically upshift the speed ratio drive from the "Second" ratio to the "Direct" speed ratio by releasing band 65 and engaging direct drive clutch C. A downshift may be manually accomplished from the "Direct" drive to both the "Second" and the "Low" ratios. The control system includes means to lock the controls in either of the "Low" or "Kickdown" ratios so that each of these ratios may be used for coast braking or the like.

The shift control valve units 140 and 240 involve the invention herein claimed. As these valve units 140 and 240 are substantially identical, only the valve unit 240, for controlling the Second to Direct upshifts and downshifts, will be described. Figs. 4-8 are enlarged views of the valve unit 240 with the valve elements thereof shown in various control positions.

Fig. 4 shows the valve unit 240 with the interconnected two-piece valves 241, 245 thereof shown in the downshifted or Second speed positions before initiation of their upshift Direct drive positions. The valve unit 240 has a three-step bore with the larger diameter of the bore at the left end receiving the valve lands 241a and 241c of valve 241 that are interconnected by the reduced diameter neck portion 241b. The right end of the valve 241 has a reduced diameter land portion 241d that contains an axially extending bore 241f. Fixedly mounted in the valve bore 241f, by a press fit or the like, is a cup-like sleeve 256. The right end portion 256a of the cup-like sleeve 256 is slotted so as to provide a means whereby the headed stem 245a on the left end of valve element 245 may be interconnected with sleeve 256 of valve 241 so as to permit a limited relative axial movement between the spool type interconnected valve elements 241 and 245. Valve element 245 comprises a pair of spaced apart valve lands 245b and 245d that are interconnected by a reduced diameter neck portion 245c. It will be noted that valve lands 245b and 245d are of a smaller diameter than either of the lands 241a, 241c or 241d of valve 241. This is of importance when considering the opposed pressure fluid generated forces applied to the interconnected valves 241 and 245 during automatic and/or driver initiated operation of the valves. The valve land 245d at the right end of valve 245 has an axially extending bore 245e that receives the compression type valve spring 243. Spring 243 tends to continuously urge the valves 245, 241 towards the left end of the stepped valve bore to the positions shown in Fig. 4.

With the valves 241, 245 positioned as shown in Fig. 4, "governor" pressure, that is a pressure fluid responsive to the speed of the transmission output shaft 81, is directed into the valve bore chamber 247 at the left end of valve 240 by means of conduit 98a. At low output shaft speeds the pressure of the "governor" pressure in chamber 247 is not high enough to shift the valves 241, 245 to the right against the opposing leftwardly directed forces applied to the right end of valve 245. Not only does the spring 243 exert a leftwardly directed force on the valves 241, 245, but in addition there is a force applied to the right end of valve 241 due to the "throttle" pressure fluid existing in the valve bore chamber 257 at the right end of the stepped valve bore. "Throttle" pressure fluid, that varies between ten and ninety (10—90) p. s. i. is supplied to valve chamber 257 by the conduit 250. When valves 241, 245 are in their downshifted positions, shown in Fig. 4, then conduit 250 can pass "throttle" pressure fluid through the valve bore position 258 and into bypass conduit 242 that is connected with the chamber 257 at the right end of valve 240.

As the output shaft 81 gains speed the "governor" pressure in chamber 247 at the left end of valve unit 240 exerts a progressively increasing force on the valves 245, 241 that tends to shift these connected valves towards the right. Fig. 5 shows the valves 241, 245 after a substantial amount of rightward shift of the valves 241, 245 but prior to the position where snap over of the valves to their upshifted positions (Fig. 6) occurs. It will be noted that in the Fig. 5 position of the valves 245, 241, that the valve land 241a has shifted rightward to a position where it has closed off supply of "throttle" pressure fluid from conduit 250 to the valve bore portion 258, conduit 242 and to the connected bore chamber 257 at the right end of the valve unit. It will also be noted that valve bore portion 258 and the connected bore chamber 257 at the right end of the valve 240 have now been connected to a drain or pressure relief outlet through the vent $V_1$. Vent $V_1$ is connected through the kickdown valve 230 to vent $V_3$ (see Figs. 4 and 6). This venting of chamber 257 has removed the force of the "throttle" pressure acting on the right end of valve 245 which force has previously been urging the valves 245, 241 towards the left in opposition to the rightwardly directed force exerted on the valves by the "governor" pressure in chamber 247. It will also be noted that the "line" pressure supply conduit 119a is still closed off from the bore of the valve 240 by the land 245d of valve 245. Thus "line" pressure, to accomplish the upshift to direct drive, is not directed into the valve bore portion 259 and into the conduits 168 and 169 until after the valves 241, 245 have upshifted to the right to a greater degree than shown in Fig. 5.

With the venting of the "throttle" pressure from the bore chamber 257 by the uncovering of vent $V_1$, due to "governor" pressure in bore chamber 247 forcing the valves 241, 245 rightward to the positions shown in Fig. 5, the previously existing force equilibrium applied to the valves 241, 245 is destroyed.

The removal of the "throttle" pressure generated force at the right end of valve 245 leaves only the spring 243 acting on the valves 241, 245 forcing them leftward and thus the "governor" pressure generated force applied to the left end of valve 241 becomes predominant and snaps the valves 241, 245 towards the right end of the valve bore (see Fig. 6).

As valves 241, 245 are snapped towards the right end of the valve bore, the "line" pressure inlet port from conduit 119a is uncovered and "line" pressure is admitted to the bore portion 259 (see Fig. 6). "Line" pressure admitted to bore portion 259 of valve 240 passes out through conduit 168 to the "off" or "release" chamber 68c of Second servo 68. This releases the Second brake band 65 and prepares the transmission for the engagement of the Direct clutch C. At the same time that "line" pressure fluid is passed into conduit 168 it will be noted that "line" pressure is also passed into the branch conduit 260. Branch conduit 260 diagrammatically represents the connected conduits 168a, 168b, 169a, 169 (see Fig. 3) that connect conduit 168 to conduit 169 so that "line" pressure will also be directed into the apply chamber 50 of Direct clutch C at the same time that Second band 65 is released. Thus it will be seen that Second band 65 is released at the same time that Direct clutch C is applied so as to accomplish the upshift from Second to Direct Drive. Also the pressurizing of the conduit 169 with "line" pressure introduces "line" pressure to the bore portion 261 of valve 240 and this effects relative movement and elongation of the connected valves 241, 245.

The branch conduit 260 not only provides for the simultaneous de-activation of Second servo 68 on activation of Direct clutch C, but in addition, branch conduit 260 provides for the application of "line" pressure to the bore chamber 261 of valve unit 240 and to the bore 241f in the right end of valve 241. This pressurizing of the valve bore chamber 261 applies "line" pressure to the left end of valve 245 and shifts the valve 245 to its extreme rightward position (Fig. 6). During this final portion of the rightward shift of valves 241, 245 there is limited relative axial movement or elongation between valves 241 and 245 of an amount equal to the length of the neck 245a of valve 245. The land 241c of valve 241 seats against the step flange 262 of the valve unit 240 after the snap over of valves 241, 245 to their unshifted position (Fig. 6). This relative axial movement between the valves 241, 245 due to the interconnected valve neck portion 245a and valve sleeve 256 after the snap over upshift provides for the successive closing off of the inlet port of the "throttle" pressure supply conduit 250 and uncovering of vent $V_1$ before the "line" pressure from supply conduit 119a is admitted to the valve bore portion 259 on a valve upshift. This limited relative movement between the valves 241, 245 is also of importance on downshift of the valves 241, 245 as will be explained subsequently.

It will be noted, when the valves 241, 245 have upshifted to the positions shown in Fig. 6, that the "throttle" pressure inlet to the left end of the valve bore from conduit 250 is closed off by the land 241a of valve 241. Accordingly, the valves 241, 245 in their upshifted position are not "throttle" pressure responsive and normal opening and closing of the throttle valve will not, in and of itself, cause undesired shifting or hunting of the connected shift valves 241, 245. The valves 241, 245 in their upshifted positions are purely output shaft speed or "governor" pressure responsive as will hereinafter be explained.

Looking at Fig. 6, it will be noted that in the upshifted position of the valves 241, 245, the valve 245 permits "line" pressure from conduit 119a to pass through valve bore portion 259 and through the conduit 260 to conduit 169 so that the valve chamber 261 of valve unit 240, as well as the valve bore 241f of valve 241, is pressurized with "line" pressure fluid. Under such conditions the only force acting on the connected valves 241, 245 that tends to downshift these valves to the left is the force of compressed springs 243 and that force caused by "line" pressure acting on the outer peripheral portions of the right end of valve land 241d of valve 241. This force is equal to the "line" pressure multiplied by the difference in area between the end area of valve land 241d of valve 241 and the end area of valve land 245b of valve 245. This "line" pressure generated valve downshifting force is opposed by the "governor" pressure generated force caused by the "governor" pressure in valve chamber 247 acting on the left end of valve land 241a of valve 241. Accordingly, a normal downshift from Direct drive to Second will occur when the force of the "line" pressure acting on the outer peripheral portion of the right end of valve land 241d exceeds the force resulting from "governor" pressure acting on the left end of valve land 241a. It will be noted that there is a great difference in area over which the "line" and "governor" pressures act so normally the automatic downshift would occur at a relatively low vehicle speed such as between 5—10 miles per hour although this can be adjusted readily. Due to the nature of the downshifting forces a very exact point of normal downshift can be determined. After the spring 243 and the "line" pressure initiated downshift force have moved connected valves 241, 245 to the left sufficiently to uncover the "throttle" pressure inlet from conduit 250 to valve bore portion 258, then the "throttle" pressure is transferred by the bypass conduit 242 to the chamber 257 at the right end of valve unit 240. Thereafter, a "throttle" pressure generated force as well as the spring force of spring 243 act on the valves 241, 245 snaps them leftward in opposition to the "governor" pressure generated force urging the valves 241, 245 rightward. Subsequent upshifting to the right of valves 241, 245 is accomplished by the snap action upshift previously explained. As previously pointed out with regard to the elongation of valves 241, 245 on upshift, the elongation is also important on downshift. Due to the valves 241, 245 being elongated on the beginning of downshift, the inlet port from "throttle" pressure supply conduit 250 is uncovered before the inlet port from "line" pressure supply conduit 119a is closed off by valve land 245d. Thus a "throttle" pressure force is built up in the bore chamber 257 to snap the valves 241, 245 to downshifted positions as the "line" pressure is vented from the bore through vent V₂.

In addition to the normal output shaft speed responsive downshift of valves 241, 245, there is also provided a driver or operator controlled kickdown whereby the transmission may be downshifted at anytime, within a predetermined upper speed safety limit, from Direct drive to Second speed. Such a kickdown is useful for sudden acceleration or for meeting extreme torque load conditions. Figs. 7 and 8 show respectively first the positions of the valves 241, 245 on initiation of a kickdown by a sudden depression of the accelerator pedal G, and second the position of these valves 241, 245 after beginning of the kickdown when the valves have reached a point where they are about to be snapped over to their downshifted Second speed positions. Due to the particular arrangement and construction of the valves 241, 245 an extremely fast, smooth kickdown or driver controlled downshift from Direct drive to Second speed is readily obtainable.

Considering Fig. 3 as well as Fig. 7, it will be noted that the accelerator pedal G is connected by linkage 116, 231 to the kickdown valve element 232. A substantially full depression of the accelerator pedal G to at least its last 5 or 10 degrees of throttle opening movement will cause the linkage 231 to shift the kickdown valve element 232 to the right (see Fig. 7) sufficiently to unseat valve land 232a and permit "line" pressure from conduit 119a to pass through valve bore portion 259 and exit into conduit 268. Conduit 268 contains a flow restriction 269 and is connected to the bore chamber 233 at the right end of valve 230. "Line" pressure of approximately 90 p. s. i. that is admitted to the bore of kickdown valve 230 is reduced to a pressure of about 50–60 p. s. i. by the perforated pressure relief valve 235. Thus the pressure of the fluid in conduit 268 on the kickdown valve side of restriction 269 is less than line pressure and may be called a reduced or compensated line pressure or the "kickdown" pressure. When the kickdown valve 232 has been shifted to the right by a substantially full accelerator pedal depression, then this 50–60 p. s. i. "kickdown" pressure fluid can pass from the kickdown valve bore 233 through valve bore portion 236 and into conduit 270 that applies the "kickdown" pressure fluid to valve bore portion 258. As bypass conduit 242 connects the valve bore portion 258 with the bore chamber 257 at the right end of valve unit 240, it is thought to be obvious that on a kickdown of the accelerator G there will suddenly be applied to the right end of valve 245 a substantial leftwardly directed force resulting from the pressurizing of chamber 257 with "kickdown" pressure fluid of approximately 50–60 p. s. i. With the application of the "kickdown" pressure to the bore portion 258 and to the bore chamber 257, leftwardly directed forces are applied to the valves 241, 245 that initiate a downshifting movement of these valves towards the left. In addition to the force of the "kickdown" pressure in the bore portion 257 it will be noted that bore portion 271 is pressurized with "kickdown" pressure and this constantly acts on valve land 241c urging the valves 241, 245 leftward. Leftward movement of the valves 241, 245 is initiated by resultant of the force of the spring 243 and the force of the "kickdown" pressure in bore portions 257, 258, 271. This leftwardly directed force is sufficiently large to overcome the force of the "governor" pressure in the valve chamber 247 at the left end of the valve unit 240 and begin the downshifting movement of the valves 241, 245. However, to insure a quick positive downshifting movement of the valving 241,245, the porting in the valve unit 240 is so arranged that after initial leftward movement of the valves 241, 245 they approach a snap over downshift position such as is shown in Fig. 8.

When the valves 241, 245 have shifted leftwardly to the positions shown in Fig. 8, then the inlet port from conduit 270 to bore portion 258 is closed off by land 241c of valve 241 so "kickdown" pressure from conduit 270 is cut off from the chamber 257 at the right end of valve 245. However, at the time the valve land 241c cuts off the supply of the 50–60 p. s. i. "kickdown" pressure to the bore portion 258 there is simultaneously applied to bore portion 258 a relatively high "throttle" pressure of approximately 85–90 p. s. i. due to the uncovering of the inlet port from conduit 250 by the leftward movement of the valve land 241a of valve 241. Accordingly, at the snap over point a significant increase in leftwardly directed force is applied to the valves 241, 245 that quickly shifts these valves leftwardly to their fully downshifted positions corresponding to those shown in Fig. 4. It will be noted that in the Fig. 8 position of the valves 241, 245, the valve land 241c has isolated the "kickdown" pressure from the bore portion 258 but the bore chamber 271 is still filled with kickdown pressure of approximately 50–60 p. s. i. while the bore chamber 257 is filled with "throttle" pressure of approximately 85–90 p. s. i. This combination of high "throttle" pressure and "kickdown" pressure generated forces is more than sufficient to snap the valves 241, 245 over to their normal downshifted positions (see Fig. 4). It is thought to be clear that the 'kickdown" pressure in bore portion 271 will exert a leftwardly directed force on the valve 241 due to the difference in diameters of the valve lands 241c and 241d. Also the increase in leftwardly directed force applied to the right end of valve land 245 at the snap over point is quite significant for it is equal to the area of the right end of valve land 245d times the difference between the high "throttle" pressure of 85–90 p. s. i. and the "kickdown" pressure of 50–60 p. s. i. It is thought to be obvious that the "kickdown" pressure in bore portion 271 of valve unit 240 is reduced to zero when the downshift is completed for the line pressure supply from conduit 119a is closed off.

While the valve unit is shown as including a compression type spring 243 in the bore chamber 257, it is thought to be obvious that this spring could be omitted and "throttle" pressure alone be relied on to oppose the "governor" pressure and control the shifting of valves 241 and 245.

Fig. 9 is a fragmentary sectional elevational view of the left end of a valve unit 280 that is similar to the valve unit 240 in that the connected, two-piece valve elements 281, 285 thereof are sustantially identical to the valve elements 241, 245 of valve unit 240. However, there is one significant difference between the valve units 240 and 280 and that is that the valve 281 is so constructed and arranged in the valve unit 280 that the connected valve elements 281, 285 are responsive to "throttle" pressure on both upshift and downshift whereas the valve elements 241, 245 of valve unit 240 are responsive to "throttle" pressure only on upshift. Comparing Fig. 6 with Fig. 9 which views each show the respective valve elements 241, 245 and 281, 285 in their fully upshifted positions, it will be noted that in Fig. 6 the "throttle" pressure inlet port from conduit 250 is closed off completely by valve land 241a of valve 241 so that the valves 241, 245 are not responsive to "throttle" pressure as regards normal downshifting. However, in Fig. 9 it will be noted that the valve land 281a of valve 280 does not completely close off the "throttle" pressure inlet port from conduit 250 when valves 281, 285 are completely upshifted. Accordingly, opening the throttle valve 120 when the valves 281, 285 are upshifted will always apply a downshifting force to the right end of valve land 281a and thus some variation in the point at which downshift from Direct to Second speed will occur can be achieved depending on the relationship between "governor" pressure and "throttle" pressure. The "throttle" pressure responsive downshift force can be controlled by varying the relative sizes of the diameters of the valve lands 281a and 281b of the valve 281. In all other respects valve 280 is similar to valve 240 so further discussion of the valve 280 is considered unnecessary.

It is thought to be clear from the foregoing description that there is herein disclosed an improved, simplified form of valve unit that is particularly adapted for controlling speed ratio changes in a hydraulically operated, motor vehicle power transmission system. However, it is obvious that such a valve unit can be used in any sort of hydraulic control system wherein several different pressure fluid sources are utilized to control the operation of a device. The invention is not to be considered limited by the specific description but merely by the appended claims.

I claim:

1. In an hydraulically operated control system for an engine driven motor vehicle power transmission unit, a pair of pressure fluid operated, speed ratio drive, control mechanisms arranged for alternate activation to provide means for selectively transmitting a pair of different speed ratio drives through said transmission unit, a source of line pressure fluid, a first conduit means connecting said source of line pressure fluid to each of said control mechanisms, an automatically controlled, differential pressure operated, valve unit connected to said first conduit means and arranged so as to control the supply of line pressure fluid to the said control mechanisms, said valve unit comprising a valve bore having mounted therein a pair of axially aligned, interconnected, relatively axially movable valves arranged for conjoint and independent axial reciprocation in said bore, a source of pressure fluid having a pressure responsive to the speed of the motor vehicle, a second conduit means connecting said source of vehicle speed responsive pressure fluid to a first one of said differential pressure operated valves, a throttle valve movable between open and closed positions for controlling the torque transmitted by the motor vehicle engine, a source of pressure fluid controlled by the movement of said throttle valve providing a source of pressure fluid having a pressure responsive to the degree of opening of the throttle valve, a third conduit means connecting the source of throttle valve responsive pressure fluid to a second one of the differential pressure operated valves in a manner whereby the vehicle speed responsive pressure fluid and the throttle valve responsive pressure fluid exert opposing forces upon the connected differential pressure operated valves to effect reciprocation thereof, and a resilient means arranged to continuously exert a force on the differential pressure operated valves that opposes the force of the vehicle speed responsive pressure fluid, said differential pressure operated valves being movable by said vehicle speed responsive pressure fluid to a first limiting position wherein the application of the throttle valve responsive fluid to said second one of said valves is prevented vent means arranged to be connected to the valve unit when said valves have been moved to said first limiting position to vent the pressure fluid responsive to the degree of opening of the throttle valve and eliminate its effect on movement of said valves after which said vehicle speed responsive pressure fluid is effective to snap said valves to a limiting position wherein the line pressure connected to said valve unit may be applied to said control mechanisms.

2. In an hydraulically operated control system for an engine driven motor vehicle power transmission unit, a pressure fluid operated, speed ratio drive, control mechanism, a source of line pressure fluid, a first conduit means connecting said source of line pressure fluid to said control mechanism, an automatically controlled, differential pressure operated, valve unit connected to said first conduit means and arranged so as to control the supply of line pressure fluid to the said control mechanisms, said valve unit comprising a valve bore having mounted therein a pair of axially aligned, interconnected, relatively axially movable valves which are arranged for movement axially of the bore, a source of pressure fluid having a pressure responsive to the speed of the motor vehicle, a second conduit means connecting said source of vehicle speed responsive pressure fluid to a first one of said differential pressure operated valves, a throttle valve movable between open and closed positions for controlling the torque transmitted by the motor vehicle engine, a source of pressure fluid controlled by the movement of said throttle valve providing a source of pressure fluid having a pressure responsive to the degree of opening of the throttle valve, a third conduit means connecting the source of throttle valve responsive pressure fluid to a second one of the differential pressure operated valves in a manner whereby the vehicle speed responsive pressure fluid and the throttle valve responsive pressure fluid exert opposing forces upon the connected differential pressure operated valves to effect reciprocation thereof, and a resilient means arranged to continuously exert a force on the differential pressure operated valves that oppose the force of the vehicle speed responsive pressure fluid applied to said valves, a vent port in the valve bore of said differential pressure operated valves for selectively releasing the throttle valve responsive pressure fluid that is applied to said second one of said differential pressure operated valves, said vent port being located such that it is uncovered after the vehicle speed responsive pressure fluid has moved said differential pressure operated valves to a first predetermined position wherein the valves are positioned such that the supply of throttle valve responsive pressure fluid to said valve bore is cut off whereby an unbalanced force acts on said valves to snap said valves to a first limiting position that permits said line pressure to be applied to said pressure fluid operated control mechanism.

3. In an hydraulically operated control system as set forth in claim 2 wherein snapping of said valves to said first limiting position, permits line pressure to be applied to said valves in such a manner as to effect relative axial movement between said valves to thereby condition said valves for a snap action shift of said valves to their second limiting position.

4. In combination an engine driven shaft, an accelerator pedal operated throttle control for the engine, a hydraulic torque converter drivingly connected to said engine driven shaft, a change speed transmission unit of the planetary gear type drivingly connected to said torque converter and comprising input and output shafts having a plurality of planetary gear trains selectively connectible therebetween to provide for the transmission of a plurality of different speed ratio drives between said shafts, fluid pressure operated servo mechanisms for controlling activation and de-activation of said planetary gear trains, and a fluid pressure operated control system for said servo mechanisms comprising an engine driven constant pressure fluid supply source having conduit means connecting said supply source to said servo mechanisms, an output shaft speed responsive governor connected to said fluid pressure supply source to provide a source of governor pressure proportional to the speed of said output shaft, and a driver controlled manually operable speed ratio selector valve connected by conduit means to said fluid pressure supply source and to said servo mechanisms to provide for driver selection of a starting speed ratio drive, an accelerator pedal operated pressure regulating valve unit connected by conduit means to said fluid pressure supply source adapted to provide a source of throttle pressure substantially proportional to the degree of opening of the engine throttle control, an automatically operable speed ratio control valve unit to effect automatic upshifts and downshifts between said starting speed ratio drive and another speed ratio drive with variations in the differential pressure relationship existing between said governor pressure and said throttle pressure comprising a valve cylinder with a bore therein having a pair of interconnected, relatively axially movable, shift control valves slidably mounted therein, conduit means to apply said throttle pressure to one of said shift valves to urge said shift valves in one axial direction, conduit means to apply said governor pressure to the other of said shift valves to urge shift valves in the opposite axial direction, fluid flow means controlled by the movement of one of said shift valves in one axial direction controlling connection of said fluid pressure supply source to said servo mechanisms to provide means to automatically effect operation of said servo mechanisms, a predetermined movement of the other of said shift valves in said one axial direction activating vent means arranged for discontinuing the application of the throttle pressure to said one of said shift valves to thereby permit snap action shift of said shift valves in one axial direction due to the predominating force of the governor pressure applied to said valves.

5. In an hydraulically operated control system, a valve unit comprising a cylinder with a pair of axially spaced valve receiving bores connected by a pressure chamber located therebetween, a first valve reciprocably mounted in one of said bores, said first valve having portions extending into said pressure chamber, resilient means normally positioning said first valve in said one bore and urging said first valve towards said other bore, a second valve reciprocably mounted in said other bore having portions engageable with said extending portions of said first valve and interconnecting said valves for limited relative axial movement, a first pressure fluid supply connected through certain portions of said other bore to certain portions of said one bore such that passage of said first pressure fluid through said certain portions of said other bore to said one bore is controlled by the location of said second valve in said other bore, a second pressure fluid supply connected to other portions of said other bore, a third pressure fluid supply connected to other portions of said one bore and arranged to be admitted to said other portions of said one bore after a predetermined axial movement of said first valve away from its normal position, conduit means connected between said other portions of said one bore and said pressure chamber whereby pressure fluid admitted to said other portions of said one bore from said third pressure fluid supply is applied to said pressure chamber to effect relative axial movement between said first and second valves to increase the effective length of said connected valves.

6. In an hydraulically operated control system, a valve unit comprising a cylinder with a pair of axially spaced valve receiving bores connected by a pressure chamber located therebetween, a first valve reciprocably mounted in one of said bores, resilient means normally positioning said first valve in said one bore and urging said first valve towards said other bore, a second valve reciprocably mounted in said other bore, means extending between said first valve and said second valve interconnecting said valves for limited relative axial movement, a first pressure fluid supply connected through certain portions of said other bore to certain portions of said one bore such that passage of said first pressure fluid through said certain portions of said other bore to said one bore is controlled by the location of said second valve in said other bore, a second pressure fluid supply connected to other portions of said other bore that are continuously isolated from said certain portions thereof, a third pressure fluid supply connected to other portions of said one bore that are continuously isolated from said certain portions thereof, said third pressure fluid supply inlet to said one bore being and arranged to admit pressure fluid to said other portions of said one bore after a predetermined axial movement of said first valve away from its normal position, conduit means connected between said other portions of said one bore and said pressure chamber whereby pressure fluid admitted to said other portions of said one bore from said third pressure fluid supply is applied to said pressure chamber to effect relative axial movement between said first and second valves to increase the effective length of said connected valves.

7. In an hydraulically operated control system, a valve unit comprising a cylinder with a pair of spaced, axially aligned, valve receiving bores and a pressure chamber connected therebetween, a first valve reciprocably mounted in one of said bores, said first valve having portions thereof extending into said pressure chamber, resilient means normally positioning said first valve in said one bore and urging it towards said other bore, a second valve reciprocably mounted in said other bore having portions engageable with said extending portions of said first valve and interconnecting said valves for limited, relative axial movement, a first pressure fluid supply conduit connected to said one bore and arranged to have flow therethrough controlled by the location of said second valve in said other bore, a second pressure fluid supply conduit connected to said other bore, said first and second pressure fluid supply conduits providing means for applying opposing, axially directed, pressure fluid generated, forces to said first and second valves, a third pressure fluid supply conduit connected to said one bore at a location such that the pressure fluid entering said one bore therefrom does not effect axial movement of said valves, the bore inlet from said third conduit being arranged to be uncovered by axial movement of said first valve to a first limiting position, conduit means connected between said third pressure fluid supply bore inlet and said pressure chamber when said first valve is in said first limiting position whereby pressure fluid admitted to said one bore from said third pressure fluid supply conduit is applied to said pressure chamber to effect relative movement between said first and second valves to increase the effective length of said connected valves.

8. In an hydraulically operated control system, a valve unit comprising a cylinder with a pair of spaced, axially aligned, valve receiving bores and a pressure chamber connected therebetween, a first valve reciprocably mounted in one of said bores, said first valve having portions thereof extending into said pressure chamber, resilient means normally positioning said first valve in said one bore and urging it towards said other bore, a second valve reciprocably mounted in said other bore having portions engageable with said extending portions of said first valve and interconnecting said valves for limited, relative axial movement, a first pressure fluid supply conduit connected to said one bore and arranged to have flow therethrough controlled by the location of said second valve in said other bore, a second pressure fluid supply conduit connected to said other bore, said first and second pressure fluid supply conduits providing means for applying opposing, axially directed, pressure fluid generated, forces to said first and second valves, a third pressure fluid supply conduit connected to said one bore at a location such that the pressure fluid entering said one bore therefrom does not effect axial movement of said valves, the bore inlet from said third conduit being arranged to be uncovered by axial movement of said first valve to a first limiting position, conduit means connected between said third pressure fluid supply bore inlet and said pressure chamber when said first valve is in said first limiting position whereby pressure fluid admitted to said one bore from said third pressure fluid supply conduit is applied to said pressure chamber to effect relative movement between said first and second valves to increase the effective length of said connected valves, a first vent port arranged to be connected to said one bore prior to axial shift of said first valve to said first limiting position and a second vent port arranged to be connected to said second bore prior to shift of said first valve to said first limiting position.

9. In an hydraulically operated control system, a first valve unit comprising a cylinder with a pair of spaced, axially aligned, valve receiving bores and a pressure chamber connected therebetween, a first valve reciprocably mounted in one of said bores, said first valve having portions thereof extending into said pressure chamber, resilient means normally positioning said first valve in said one bore and urging it towards said other bore, a second valve reciprocably mounted in said other bore having portions engageable with said extending portions of said first valve and interconnecting said valves for limited, relative axial movement, a first pressure fluid supply conduit connected to said one bore and arranged to have flow therethrough controlled by the location of said second valve in said other bore, a second pressure fluid supply conduit connected to said other bore, said first and second pressure fluid supply conduits providing means for applying opposing, axially directed, pressure fluid generated, forces to said first and second valves to effect automatic operation thereof, a third pressure fluid supply conduit connected to said one bore at a location such that the pressure fluid entering said one bore therefrom does not effect conjoint axial movement of said valves, the bore inlet from said third conduit being arranged to be uncovered by axial movement of said first valve to a first limiting position, conduit means connected between said third pressure fluid supply bore inlet and said pressure chamber when said first valve is in said first limiting position whereby pressure fluid admitted to said one bore from said third pressure fluid supply conduit is applied to said pressure chamber to effect relative movement between said first and second valves to increase the effective length of said connected valves, a first vent port arranged to be connected to said one bore of said first valve prior to axial shift of said first valve to said first limiting position and a second vent port arranged to be connected to said other bore of said first valve prior to shift of said first valve to said first limiting position and a second valve unit comprising a cylinder bore mounting an axially reciprocable, operator operable valve adapted to provide means to overrule the automatic operation of the valves of said first valve unit, said second valve unit cylinder bore having a first bore portion connected by conduit means to those portions of said one bore of said first valve unit that are supplied with pressure fluid from said third pressure fluid supply conduit when said first valve of said first valve unit is in said first limiting position and a second bore portion in said second valve unit cylinder bore connectible to the first bore portion thereof by operation of said second valve unit operable valve, said second bore portion being connected to those portions of the other bore of said first valve unit that are arranged to be connected to said one bore of the first valve unit.

10. In an hydraulic control system as set forth in claim 9 wherein the second bore portion of said second valve unit has a pressure relief valve to control the pressure applied to the valves of said first valve unit by operation of said second valve unit.

11. In an hydraulic control system as set forth in claim 9 wherein the conduit means connecting the said one bore of the first valve unit to the said first bore portion of said second valve unit includes pressure fluid flow restriction means.

12. In an hydraulically operated control system a valve unit comprising a cylinder having a pair of axially spaced valve bores with an axially aligned pressure chamber connected therebetween, a first valve reciprocably mounted in one of said bores, said first valve having portions thereof extending into said pressure chamber, resilient means normally urging said first valve towards said other bore, a second valve reciprocably mounted in said other bore having portions thereof interconnected with the extending portions of said first valve so as to permit limited, relative axial movement between said valves, conduit means arranged to connect certain portions of said one bore to said pressure chamber when said first valve is moved in one axial direction to a predetermined position in said one bore, a first pressure fluid source connected to other portions of said one bore providing means to urge said connected valves in the opposite axial direction, a second pressure fluid source connected to said other bore providing means to urge said connected valves in said one axial direction, a third pressure fluid source connected to said certain portions of said one bore, a first vent port connected to said certain portions of said one bore arranged to vent said pressure chamber when said first valve is positioned in said one bore so as to close off said third pressure fluid source from said certain portions of said one bore, and a second vent port connected to portions of said other valve bore that are continuously separated from the portions thereof acted on by said second pressure fluid source.

13. In a hydraulically operated control system, a valve unit comprising a cylinder having a pair of axially spaced valve bores with an axially aligned pressure chamber connected therebetween, a first valve reciprocably mounted in one of said bores, said first valve having portions thereof extending into said pressure chamber, resilient means normally positioning said first valve in said one bore and urging said first valve towards said other bore, a second valve reciprocably mounted in said other bore having portions thereof interconnected with the extending portions of said first valve so as to permit limited, relative axial movement between said valves, conduit means arranged to connect certain portions of said one bore to said pressure chamber when said first valve is moved in one axial direction from its normal position to a predetermined position in said one bore, a first pressure fluid source connected through certain portions of said other bore to other portions of said one bore providing means to urge said connected valves in the other axial direction, a second pressure fluid source connected to other portions of said other bore providing means to urge said connected valves in said one axial direction, a third pressure fluid source connected to said certain portions of said one bore, a first vent port connected to said certain portions of said one bore arranged to vent said pressure chamber when said first valve is positioned in said one bore so as to close off said third pressure fluid source from said certain portions of said one bore, and a second vent port connected to said certain portions of said other valve bore and arranged such that it is closed off from said certain portions of the other valve bore by said second valve when the first source of pressure fluid is connected through said certain portions of said other bore.

14. In an hydraulically operated control system, a valve unit comprising a cylinder with a pair of axially spaced valve receiving bores connected by a pressure chamber located therebetween, a first valve reciprocably mounted in one of said bores, resilient means normally positioning said first valve in said one bore and urging said first valve towards said other bore to a first limiting position, a second valve reciprocably mounted in said other bore, means extending between said valves interconnecting said valves for limited relative axial movement, a first pressure fluid supply connected through certain portions of said other bore to certain portions of said one bore such that passage of pressure fluid from said first pressure fluid supply through said certain portions of said other bore to said certain portions of said one bore is controlled by the location of said second valve in said other bore, a second pressure fluid supply connected to other portions of said other bore which other portions are continuously isolated from said certain portions of said other bore, the application of pressure fluid from said first and second pressure fluid supplies to said valves being in opposed relationship such that the pressure differential therebetween effects conjoint axial movement of said valves, a third pressure fluid supply connected to other portions of said one bore that are continuously isolated from said certain portions of said one bore, the supply of pressure fluid from said third source to said other portions of said one bore occurring after a predetermined axial movement of said first valve away from its normal first limiting position, conduit means connected between said other portions of said one bore and said pressure chamber whereby pressure fluid from said third supply admitted to said other portions of said one bore is applied to said pressure chamber to effect relative axial movement between said first and second valves to increase the effective length of said connected valves.

15. In an hydraulically operated control system, a valve unit comprising a cylinder with a pair of axially spaced valve receiving bores connected by a pressure chamber located therebetween, a first valve reciprocably mounted in one of said bores, resilient means normally positioning said first valve in said one bore and urging said first valve towards said other bore to a first limiting position, a second valve reciprocably mounted in said other bore, means extending between said valves interconnecting said valves for limited relative axial movement, a first pressure fluid supply connected through certain portions of said other bore to certain portions of said one bore such that passage of pressure fluid from said first pressure fluid supply through said certain portions of said other bore to said certain portions of said one bore is controlled by the location of said second valve in said other bore, a second pressure fluid supply connected to other portions of said other bore which other portions are continuously isolated from said certain portions of said other bore, the application of pressure fluid from said first and second pressure fluid supplies to said valves being in opposed relationship such that the pressure differential therebetween effects conjoint axial movement of said valves, a third pressure fluid supply connected to other portions of said one bore that are continuously isolated from said certain portions of said one bore, the supply of pressure fluid from said third source to said other portions of said one bore occurring after a predetermined axial movement of said first valve away from its normal first limiting position, conduit means connected between said other portions of said one bore and said pressure chamber whereby pressure fluid from said third supply admitted to said other portions of said one bore is applied to said pressure chamber to effect relative axial movement between said first and second valves to increase the effective length of said connected valves, a first vent port connected to said other portions of said one bore, and a second vent port connected to said certain portions of said other bore.

16. In an hydraulically operated control system, a valve unit comprising a cylinder with a pair of axially spaced valve receiving bores connected by a pressure chamber located therebetween, a first valve reciprocably mounted in one of said bores, a second valve reciprocably mounted in said other bore, means extending between said first and second valves interconnecting said valves for limited relative axial movement, a first pressure fluid supply connected through certain portions of said other bore to certain portions of said one bore such that passage of said first pressure fluid through said certain portions of said other bore to said one bore is controlled by the location of said second valve in said other bore, a second pressure fluid supply connected to other portions of said other bore that are continuously isolated from said certain portions of said other bore, the pressure fluid applied to said valves by said first and second pressure fluid supply sources acting on said valves in opposed relationship such that the pressure differential therebetween effects conjoint axial movement of said valves, a third pressure fluid supply connected to other portions of said one bore that are continuously isolated from said certain portions of said one bore, the pressure fluid from said third supply being admitted to said other portions of said one bore after a predetermined axial movement of said first valve conduit means connected between said other portions of said one bore and said pressure chamber whereby pressure fluid admitted to said other portions of said one bore from said third pressure fluid supply is applied to said pressure chamber to effect relative axial movement between said first and second valves to increase the effective length of said connected valves, a first vent port arranged to be connected to said other portions of said one bore while pressure fluid supply from said third source is closed off from said one bore, and a second vent port connected to said certain portions of said other bore, said second valve being formed so as to provide means connecting said second vent port to said certain portions of said one bore when said second valve is positioned so as to close off supply of pressure fluid from said first pressure fluid supply to said certain portions of said one bore.

17. In a hydraulic control system as set forth in claim 16 wherein said second valve is formed such that the pressure fluid from said second pressure fluid supply will apply an unbalanced axially directed force to said valves after said second valve has moved to a position closing off the supply of pressure fluid from said first pressure fluid supply to said certain portions of said one bore.

18. In an hydraulically operated control system, a first valve unit comprising a cylinder with a pair of axially spaced valve receiving bores connected by a pressure chamber located therebetween, a first valve reciprocably mounted in one of said bores, a second valve reciprocably mounted in said other bore, means connected between said first and second valves interconnecting said valves for limited relative axial movement, a first pressure fluid supply source connected through certain portions of said other bore to certain portions of said one bore such that passage of said first pressure fluid through said certain portions of said other bore to said certain portions of said one bore is controlled by the location of said second valve in said other bore, a second pressure fluid supply source connected to other portions of said other bore that are continuously isolated from said certain portions of said other bore, said pressure fluids from said first and second supply sources applying forces to said connected valves in opposed relationship such that axial movement of said valves results from the pressure differential between said first and second pressure fluids, a third pressure fluid supply source arranged to be connected to other portions of said one bore that are continuously isolated from said certain portions of said one bore, pressure fluid from the third source being arranged to be admitted to said other portions of said one bore after a predetermined axial movement of said first valve by the pressure fluid from said second supply source, conduit means connected between said other portions of said one bore and said pressure chamber whereby pressure fluid admitted to said other portions of said one bore from said third pressure fluid supply is applied to said pressure chamber to effect relative axial movement between said first and second valves to increase the effective length of said connected valves, a first vent port arranged to be connected to said other portions of said one bore when the first pressure fluid supply source is connected to said certain portions of said one bore, and a second vent port arranged to be connected to said certain portions of said other bore when said second valve closes off connection of said first pressure fluid supply source to said certain portions of said other bore.

19. In an hydraulically operated control system, a first valve unit comprising a cylinder with a pair of axially spaced valve receiving bores connected by a pressure chamber located therebetween, a first valve reciprocably mounted in one of said bores, a second valve reciprocably mounted in said other bore, means connected between said first and second valves interconnecting said valves for limited relative axial movement, a first pressure fluid supply source connected through certain portions of said other bore to certain portions of said one bore such that passage of said first pressure fluid through said certain portions of said other bore to said certain portions of said one bore is controlled by the location of said second valve in said other bore, a second pressure fluid supply source connected to other portions of said other bore that are continuously isolated from said certain portions of said other bore, said pressure fluids from said first and second supply sources applying forces to said connected valves in opposed relationship such that axial movement of said valves results from the pressure differential between said first and second pressure fluids, a third pressure fluid supply source arranged to be connected to other portions of said one bore that are continuously isolated from said certain portions of said one bore, pressure fluid from the third source being arranged to be admitted to said other portions of said one bore after a predetermined axial movement of said first valve by the pressure fluid from said second supply source, conduit means connected between said other portions of said one bore and said pressure chamber whereby pressure fluid admitted to said other portions of said one bore from said third pressure fluid supply is applied to said pressure chamber to effect relative axial movement between said first and second valves to increase the effective length of said connected valves, a first vent port arranged to be connected to said other portions of said one bore when the first pressure fluid supply source is connected to said certain portions of said one bore, a second vent port arranged to be connected to said certain portions of said other bore when said second valve closes off connection of said first pressure fluid supply source to said certain portions of said other bore, and a second operator operated valve unit connected between said other portions of said one bore and said certain portions of said other bore of said first valve unit so as to provide means to apply a pressure fluid generated force to said second valve of said first valve unit while said first pressure fluid supply source is closed off from said certain portions of said one bore which pressure fluid generated force will oppose the force of the pressure fluid from said second pressure fluid supply source that is applied to said second valve of said first valve unit.

20. In an hydraulically operated control system, a first valve unit comprising a cylinder with a pair of axially spaced valve receiving bores connected by a pressure chamber located therebetween, a first valve reciprocably mounted in one of said bores, resilient means normally positioning said first valve in said one bore and urging said first valve towards said other bore to a first limiting position, a second valve reciprocably mounted in said other bore, means extending between said valves interconnecting said valves for limited relative axial movement, a first pressure fluid supply source connected through certain portions of said other bore to certain portions of said one bore such that passage of pressure fluid from said first pressure fluid supply source through said certain portions of said other bore to said certain portions of said one bore is controlled by the location of said second valve in said other bore, a second pressure fluid supply source connected to other portions of said other bore which other portions are continuously isolated from said certain portions of said other bore, the application of pressure fluid from said first and second pressure fluid supply sources to said valves being in opposed relationship such that the pressure differential therebetween effects conjoint axial movement of said valves, a third pressure fluid supply source connected to other portions of said one bore that are continuously isolated from said certain portions of said one bore, the supply of pressure fluid from said third pressure fluid source to said other portions of said one bore occurring after a predetermined axial movement of said first valve away from its normal first limiting position, conduit means connected between said other portions of said one bore and said pressure chamber whereby pressure fluid from said third supply admitted to said other portions of said one bore is applied to said pressure chamber to effect relative axial movement between said first and second valves to increase the effective length of said connected valves, a first vent port arranged to be connected to said other portions of said one bore, and a second vent port arranged to be connected to said certain portions of said other bore, and a second operator operated valve unit connected between said other portions of said one bore and said certain portions of said other bore of said first valve unit so as to provide means to apply a pressure fluid generated force to said second valve of said first valve unit while said first pressure fluid supply source is closed off from said certain portions of said one bore which pressure fluid generated force will oppose the force of the pressure fluid from said second pressure fluid supply source that is applied to said second valve of said first valve unit.

21. In an hydraulically operated control system for an engine driven power transmission unit having driving and driven shafts, a pair of pressure fluid operated, speed ratio drive, control mechanisms arranged for alternate activation to provide means for selectively transmitting a pair of different speed ratio drives through said transmission unit, a source of line pressure fluid, a first conduit means having portions connecting said source of line pressure fluid to each of said control mechanisms, an automatically controlled, differential pressure operated, valve unit connected to said first conduit means and arranged so as to control the supply of line pressure fluid to the said control mechanisms, said valve unit comprising a valve bore having mounted therein a pair of interconnected, relatively movable valves arranged for conjoint and independent movement in said bore, a source of pressure fluid having a pressure responsive to the speed of one of said transmission shafts, a second conduit means connecting said source of shaft speed responsive pressure fluid to a first one of said differential pressure operated valves, a throttle valve for said engine movable between open and closed positions for controlling the torque transmitted by the engine, a source of pressure fluid controlled by the movement of said throttle valve providing a source of pressure fluid having a pressure responsive to the degree of opening of the throttle valve, a third conduit means connecting the source of throttle valve responsive pressure fluid to a second one of the differential pressure operated valves in a manner whereby the shaft speed responsive pressure fluid and the throttle valve responsive pressure fluid exert opposing forces upon the connected differential pressure operated valve to effect movement thereof, and vent means to neutralize the effect of the throttle valve responsive pressure fluid on said valves, said differential pressure operated valves being movable by said shaft speed responsive pressure fluid to a first predetermined position wherein the application of the throttle valve responsive fluid to said second one of said valve is prevented after which said shaft speed responsive pressure fluid is effective to snap said valves to a limiting position wherein the line pressure connected to said valve unit may be applied to at least one of said control mechanisms.

22. In an hydraulically operated control system as set forth in claim 21 wherein the valves are arranged such that upon movement thereof towards said first limiting position line pressure is applied to said valves to effect snap action shift thereof.

23. In an hydraulically operated control system as set forth in claim 22 wherein means are provided whereby the line pressure applied to said valves as said valves are shifted to said first limiting position acts on the valves and effects relatively movement between said valves.

24. In an hydraulically operated control system as set forth in claim 21, an operator operable valve unit connected to portions of said automatically controlled valve unit so as to provide a control valve for applying a pressure fluid to those portions of said automatically operable valves normally acted on by the throttle valve responsive pressure fluid when the source of throttle valve responsive pressure fluid is disconnected from the valve bore of the automatically controlled valve unit.

25. In an hydraulically operated control system for a control mechanism, a first source of pressure fluid, a first conduit means having portions connecting said first source of pressure fluid to the control mechanism, an automatically controlled, differential pressure operated, valve unit connected to said first conduit means and arranged so as to control the supply of said first pressure fluid to the said control mechanism, said valve unit comprising a valve bore having mounted therein a pair of relatively movable valves arranged for conjoint and independent movement in said bore, a source of a second pressure fluid having a variable pressure, a second conduit means connecting said second source of pressure fluid to a first one of said differential pressure operated valves, a third source of pressure fluid providing a second source of variable pressure fluid, a third conduit means connecting the third source of pressure fluid to a second one of the differential pressure operated valves in a manner whereby the two variable pressure fluids exert opposing forces upon the connected differential pressure operated valves to effect movement thereof, and vent means to neutralize the effect of one of the variable pressure fluids on said valves when the valves are shifted to a predetermined position, said differential pressure operated valves being movable by the other one of said variable pressure fluids to said predetermined position after which said first variable pressure fluid is effective to snap said valves to a limiting position wherein the first source of pressure fluid is connected to said control mechanisms.

26. In an hydraulically operated control system as set forth in claim 25 including an operator operable valve connected to a source of fluid pressure and connectible to portions of the valve bore for said automatically controlled valve unit, said operator operable valve providing means to apply pressure fluid to the portions of the automatically operable valve unit normally vented by said vent means when said automatically operable valves are in said limiting position whereby a force may be applied to said automatically operable valves to overcome the force applied thereto by said first variable pressure fluid.

References Cited in the file of this patent

UNITED STATES PATENTS

| | | |
|---|---|---|
| 2,541,391 | Weiss et al. | Feb. 13, 1951 |
| 2,603,943 | Everden | July 22, 1952 |
| 2,627,189 | McFarland | Feb. 3, 1953 |
| 2,630,895 | McFarland | Mar. 10, 1953 |
| 2,640,373 | Jandasek | June 2, 1953 |
| 2,663,393 | Livermore | Dec. 22, 1953 |